Aug. 6, 1957 C. CHEW 2,801,726
ARTICLE CONVEYING AND TRANSFER APPARATUS
Filed Oct. 14, 1954 3 Sheets-Sheet 1
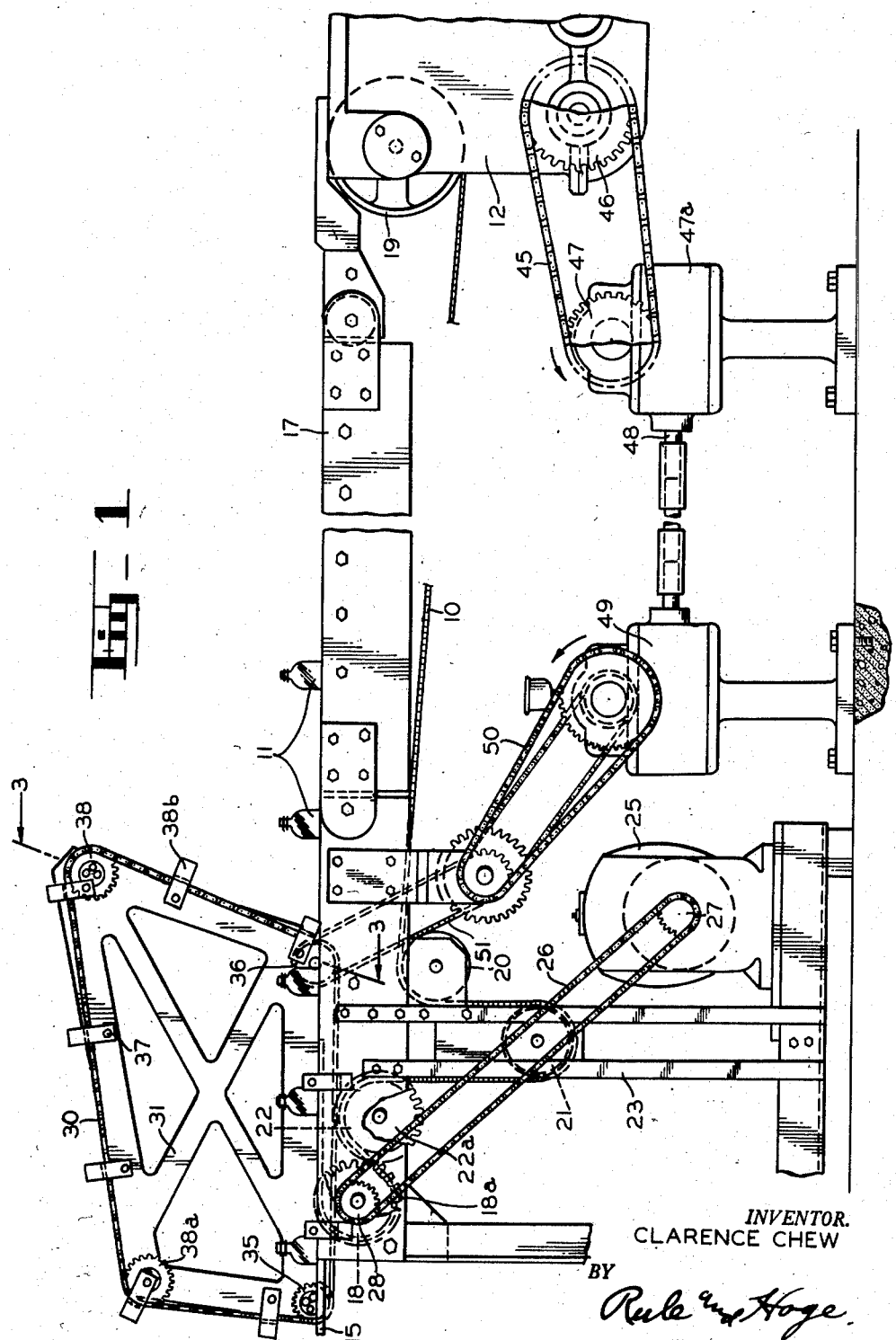
INVENTOR.
CLARENCE CHEW
BY
ATTORNEYS

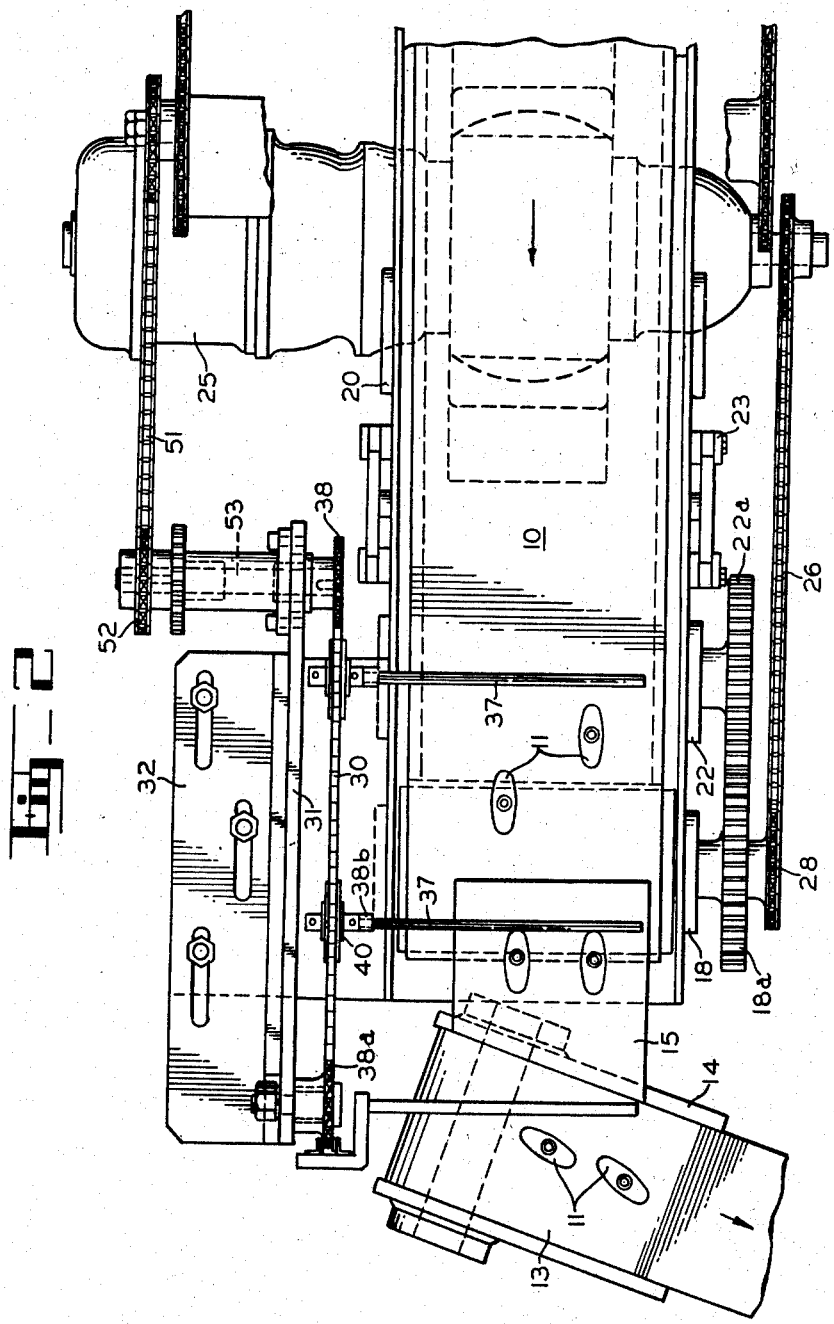

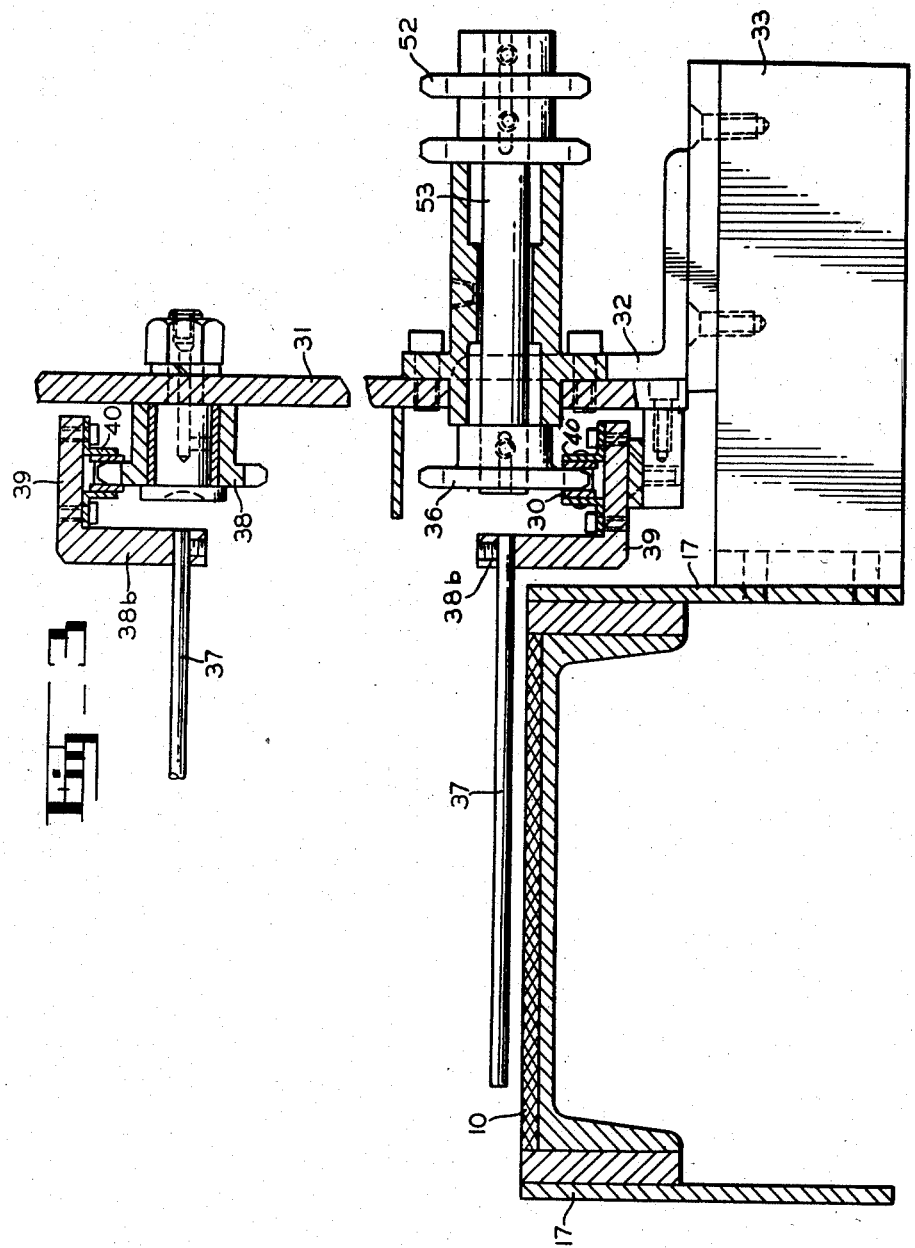

United States Patent Office 2,801,726
Patented Aug. 6, 1957

2,801,726

ARTICLE CONVEYING AND TRANSFER APPARATUS

Clarence Chew, Godfrey, Ill., assignor to Owens-Illinois Glass Company, a corporation of Ohio Application October 14, 1954, Serial No. 462,226

7 Claims. (Cl. 198—32)

My invention relates to apparatus for conveying articles and for transferring them from one conveyor to another. The invention is of utility in the manufacture of glass bottles, jars, and other articles and is herein illustrated and described as used for transferring glass articles from one conveyor to another during the passage of the articles from a forming machine to the annealing leer. The invention is not limited to this particular use.

In the manufacture of glassware such as bottles, jars, or tumblers, the articles when discharged from the forming molds are ordinarily placed on a horizontally traveling conveyor by which they are carried to a conveyor extending across the entrance of the annealing leer. The conveyors are usually at right angles to one another and a transfer finger wheel is used to transfer the articles from one conveyor to the other and change their direction of travel. Stationary guide wires or the like are arranged to guide the articles during such transfer.

The glass articles during their transfer from the forming machine to the leer are at a high temperature at which the glass is comparatively soft and susceptible to the marring effects of their contact with the transfer apparatus. The guide wires in particular tend to cause checks, scratches or other surface defects while the articles are in rubbing contact with and being turned by the guide wires. There is also a tendency for the articles to be tipped over during the transfer, particularly as they travel at a rather high speed. An object of the present invention is to provide an apparatus for transferring the glassware without the use of the usual transfer finger wheels and like devices and in a manner to overcome the above objections.

In the manufacture of glass articles of the type indicated, plural cavity molds are extensively used which mold a plurality of articles simultaneously. The articles are discharged in duplicate or in groups in rapid succession. The articles must be arranged in a single line on the receiving conveyor which, in present day practice necessitates the use of an additional finger wheel or the like. A further object of the present invention is to provide an apparatus in which the difficulties and objections incident to arranging the articles in a single row on the main conveyor are eliminated.

Other objects of the invention will appear hereafter.

Referring to the accompanying drawings:

Fig. 1 is a side elevational view of an apparatus constructed in accordance with my invention.

Fig. 2 is a plan view of the apparatus, parts being broken away.

Fig. 3 is a section at the line 3—3 on Fig. 1.

The apparatus comprises a horizontally traveling endless belt conveyor 10 by which articles 11, such as glass bottles or jars, discharged from the molds of a forming machine 12, are carried to a transfer station. A second horizontally traveling endless belt conveyor 13 (Fig. 2) is mounted on a conveyor frame 14 the receiving end of which is adjacent to the discharge end of the conveyor 10. The two conveyor belts have their upper stretches extending in substantially the same horizontal plane. The conveyor 13 extends in a direction approximately at right angles to that of the conveyor 10. The articles during the transfer are pushed across a stationary dead plate 15 between and in the horizontal plane of the conveyor belts. The articles as they are received on the conveyor 13 are advanced to form a row extending across the receiving end of the annealing leer to which the rows of articles are transferred.

The conveyor 10 is carried on a conveyor frame 17. The conveyor is trained over a driving drum 18 journalled in the forward end of the conveyor frame, an idler drum 19 at the receiving end, a guide roll 20, a tension and take-up roll 21, and a guide roll 22. The take-up roll 21 is mounted for free up and down movement in vertical guide rails 23 and is weighted to maintain a tension on the conveyor. Intermeshing gears $18^a$ and $22^a$ are connected to the rolls 18 and 22 respectively. The conveyor 10 is continuously driven in synchronism with the glass blowing machine by which the articles 11 are formed. The machine is powered by an electric motor which operates through a train of gearing to drive the conveyor belt 10. The gear train comprises a variable speed drive unit 25 and a sprocket chain 26 trained over a sprocket 27 driven from the unit 25, and a sprocket 28 keyed to the shaft of the conveyor drum 18. The articles 11 as discharged from the forming molds are placed at regular intervals lengthwise of the conveyor belt as shown in Fig. 1. These articles may be discharged in pairs from double mold cavities and advance in pairs along the conveyor as indicated in Fig. 2.

A transfer mechanism for transferring the articles from the first linear conveyor 10 to the second linear conveyor 13 will now be described. This transfer mechanism includes an endless chain 30 mounted on a vertically disposed frame 31. The frame 31 is mounted at one side of and parallel with the conveyor frame 17. A bracket 32 (Fig. 3) connects the frame 31 to supporting members 33 secured to the conveyor frame 17. The chain 30 is trained over sprocket wheels on the frame 31, including lower forward and rear sprockets 35 and 36, and upper forward and rear sprockets $38^a$ and 38. The lower stretch of the chain 30 extends horizontally and as shown in Fig. 3 is a short distance below the plane of the conveyor belt 10.

Attached to the chain 30 at equally spaced intervals are finger-like projections or rods 37 which project laterally from the chain 30 and during their travel with the lower stretch of the chain are directly over and spaced a short distance above the conveyor belt 10. The rods 37 are connected to the chain 30 by angle brackets $38^b$. Each bracket includes a horizontal section 39 connected by angle bars 40 to the chain 30. The conveyor chain 30 is driven in synchronism with the forming machine through a train of gearing including a chain 45 (Fig. 1) trained over sprockets 46 and 47, the latter having driving connection through a gear box $47^a$ with a horizontal shaft 48 which extends forwardly to a gear box 49. The gear train is continued through chains 50 and 51, the latter being trained over a sprocket 52 (Figs. 2 and 3). Sprocket 52 is keyed to the shaft 53 to which the chain sprocket 36 is also keyed.

In operation the chain 30 is continuously driven in synchronism with and at the same or approximately the same linear speed as the belt conveyor 10. The fingers 37, as they move downwardly with the reach of the chain between the gears 38 and 36, are brought to positions directly behind and close to the articles 11. As shown, this reach of the chain is downwardly and forwardly inclined thereby giving a corresponding forward movement to the fingers as they move downwardly behind the articles 11. This narrows the gap between a finger and the adjoining article, such gap being produced by the forward movement of the article while the finger is behind it, but before said finger reaches its lowermost position and commences its horizontal forward movement.

While article 11 is being carried forward beyond the sprocket 36, the finger 37 moves forward at the same speed until the transfer station is reached at the forward end of the belt conveyor. The transfer finger 37 continues its horizontal travel and thereby pushes the article or articles 11 across the stationary dead plate 15 and on to the conveyor 13. The latter being extended at a small angle to the finger 37 permits the article to move forward with the conveyor 13 in a direction divergent from the finger so that when the finger starts its upward travel it is free from the article 11.

The pusher fingers 37 are offset inwardly from the carrier chain 30 so that the closed path in which they travel is shorter than that of the chain. As shown in Fig. 3 the fingers 37 are substantially in line with the axes of the sprocket gears 35 and 36 while their carrying brackets 38 are passing around the gears and changing their direction of travel. With such construction the fingers 37 remain substantially stationary for a brief period of time when they are brought to the forward limit of their travel, namely in line with the gear 35. During this brief interval the article or articles which have been pushed on to the conveyor 13 by the finger, move forwardly with the conveyor thus providing clearance between the article and the pusher finger before the latter commences its upward movement. This prevents possible displacement or tipping over of the article which might otherwise occur, particularly with some forms of ware.

As above described the pusher fingers 37 are spaced the same distance apart as the articles on the conveyor 10 so that while the articles are traversing the portion of their path forwardly of the gear 36 the pusher fingers remain spaced behind the articles a short distance. If desired the chain 30 may be driven at a slightly higher speed than the belt 10 sufficient to cause the fingers to overtake the article 11 at or near the transfer station. With this higher speed the spacing of the fingers 37 on the chain would be increased a corresponding amount to maintain their travel in synchronism with that of the containers.

Modifications may be resorted to within the spirit and scope of my invention.

I claim:

1. The combination of a first horizontal linear conveyor, an adjacent transversely disposed second horizontal conveyor, apparatus for transferring glassware from the end of the said first conveyor to said second conveyor, comprising a dead plate spanning the space between said end of said first conveyor and said second conveyor, means for driving said conveyors and causing the said first conveyor to travel forwardly toward the dead plate and causing the said second conveyor to travel away from the dead plate, a plurality of sprockets, an endless chain encircling said sprockets, at least two of said sprockets being disposed to guide one flight of said chain parallel with said first conveyor and adjacent to the said end of said first conveyor, said sprockets having their axes horizontal and extending transversely of the direction of travel of said first conveyor, one of said two sprockets having a portion of its axis positioned forwardly of said first conveyor and between vertical planes defined by the lateral edges of said second conveyor, a third one of said sprockets disposed generally vertically above said second sprocket, a plurality of finger-like projections secured to said chain and projecting laterally therefrom to transversely overlie said first conveyor, said projections being spaced around said chain in the same relationship as the anticipated spacing of glassware on said first conveyor, and means for driving one of said sprockets in synchronism with the travel of said first conveyor and in a direction to drive said one flight of said chain in the said forward direction of travel of said first conveyor and in synchronism with said glassware.

2. The combination of a first horizontal linear conveyor, an adjacent transversely disposed second horizontal conveyor, apparatus for transferring glassware from the end of the said first conveyor to said second conveyor, comprising a dead plate spanning the space between said end of said first conveyor and said second conveyor, means for driving said conveyors and causing the said first conveyor to travel forwardly toward the dead plate and causing the said second conveyor to travel away from the dead plate, an endless chain having finger-like conveying elements secured thereto in spaced relationship, means for positioning said chain so as to provide a horizontal flight intermediate two vertically-directed flights, said horizontal flight being disposed parallel and adjacent to said end of said first conveyor and extending in the direction of travel of said first conveyor and with said conveying elements on said flight overlying said first conveyor, said horizontal flight joining one of said vertically directed flights at a point intermediate the vertical planes defined by the lateral edges of said second conveyor, said conveying elements being spaced on said chain to conform to the expected spacing of glassware on said first conveyor, and means for driving said chain in synchronism with the travel of said first conveyor and in a direction to move said flights forwardly in the direction of travel of said first conveyor.

3. The combination defined in claim 2, wherein the other of said vertically-extending flights is vertically inclined so that the top portions thereof are horizontally displaced from the lowermost portions thereof in a rearward direction relative to the travel of said one conveyor.

4. The combination defined in claim 2, wherein the other of said vertically directed flights is vertically inclined, so that the top portions thereof are horizontally displaced from the lowermost portions thereof in a rearward direction relative to the travel of said one conveyor, the degree of vertical inclination being proportioned relative to the expected spacing of glassware on said conveyor to successively closely position each of said conveying elements behind a glassware unit, whereby the movement of the glassware across said dead plate occurs without substantial deceleration of the glassware.

5. Apparatus for conveying and transferring articles comprising a first horizontally travelling conveyor on which the articles are supported and spaced at uniform distances in the direction of travel and by which the articles are conveyed to a transfer station, a second horizontally traveling conveyor extending from said station in substantially the same horizontal plane with the first conveyor and travelling in a direction at an angle to that of the first conveyor, a transfer means comprising an endless chain carrier, pusher fingers connected to the carrier at uniformly spaced intervals therealong and projecting laterally therefrom, means for driving said chain carrier in a closed path comprising a stretch extending lengthwise of and adjacent to said first conveyor and extending through said transfer station, the position of the said pusher fingers relative to the endless chain carrier being such that during their travel along said stretch they are carried forward from a position directly over the discharge end portion of the conveyor, through the transfer station, to a position directly over the said second conveyor and thereby push the said articles from the first to the second conveyor, the path of travel of said pusher fingers being extended upwardly from said second conveyor.

6. The apparatus defined in claim 5, the means for connecting the pusher fingers to said chain comprising connectors holding the fingers in position for travel in a closed path spaced inwardly from the path of the chain, said connectors extending inwardly from the chain, and sprocket gears over which the chain is trained for travel in its closed path.

7. The apparatus defined in claim 5, said chain including a downwardly and forwardly extending stretch along which the pusher fingers are carried forwardly and downwardly to position them behind the articles on the first horizontal conveyor.

References Cited in the file of this patent

UNITED STATES PATENTS 2,142,271   Herrmann _____ Jan. 3, 1939